United States Patent Office 3,230,896
Patented Jan. 25, 1966

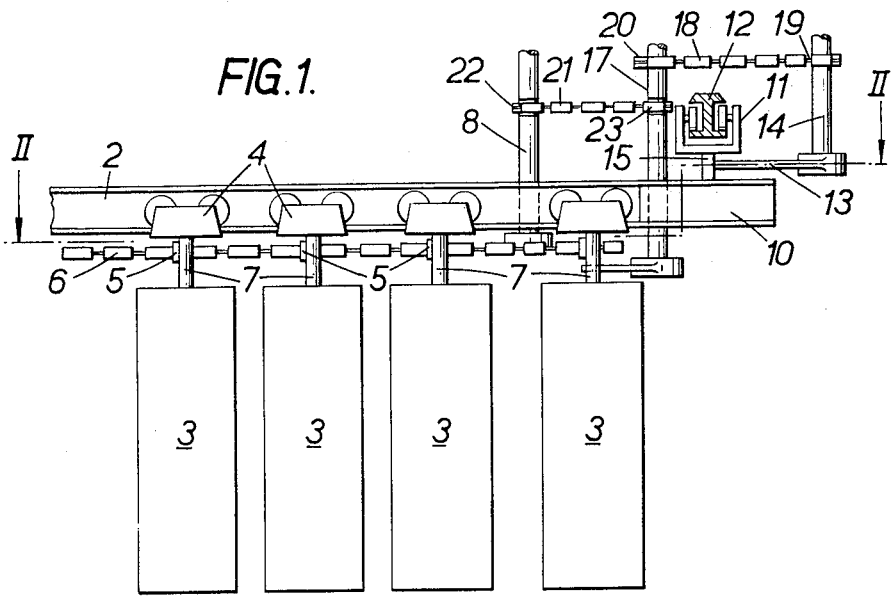
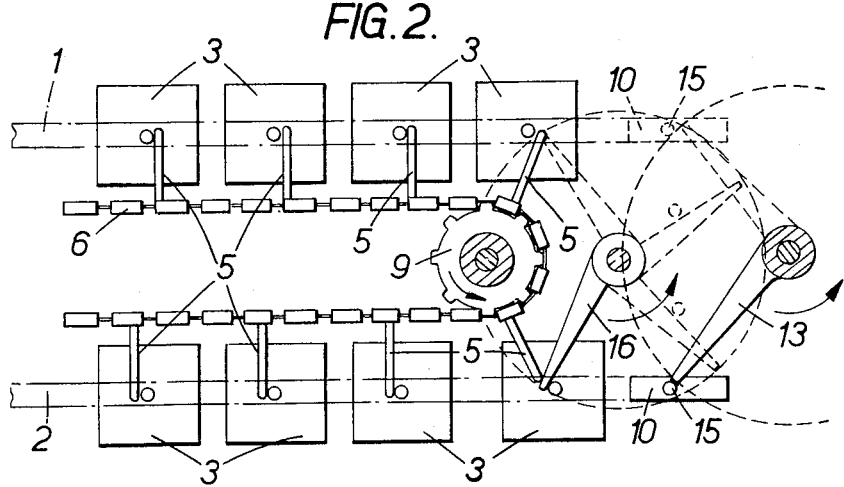

3,230,896
CONVEYOR SYSTEMS FOR PACKAGE
IRRADIATION PLANTS
John Grant, Abingdon, England, assignor to United Kingdom Atomic Energy Authority, London, England
Filed Oct. 30, 1963, Ser. No. 320,214
Claims priority, application Great Britain, Nov. 12, 1962, 42,631/62
4 Claims. (Cl. 104—96)

This invention relates to conveyor systems and is particularly but not exclusively concerned with a conveyor system suitable for use in an irradiation plant for example in the plant described in British Patent No. 982,691.

In the said co-pending application a system for conveying packages, arranged in columns on carriers suspended from overhead railway track, comprises a series of discrete portions of railway track arranged substantially parallel to each other and transfer means whereby a short section of track is moved transversely to align first with one portion of track and then another to pass the carriers along each portion of track in succession.

However in the previously proposed arrangement the drive to the transfer mechanism was intermittent and tended to introduce difficulties in the drive mechanism particularly in relation to the correct phasing of the carrier movements.

The object of the present invention is to provide a continuously moving conveyor system whereby the said phasing difficulties are minimised.

According to the present invention a conveyor system comprises at least two discrete, substantially parallel spaced tracks, carriers at spaced intervals along the track and continuously operating carrier transfer means whereby a carrier is transferred from one track to another in the time taken to move a carrier through a carrier spacing distance along the tracks.

Preferably a carrier reaching the end of a track is accelerated onto a movable section of track, said section is moved into alignment with a further track in the series and the carrier accelerated onto the further track, such that the spacing of the carriers on the discrete tracks remain uniform.

According to a further feature of the invention the carrier transfer motion is rectilinear and the transfer means compises an arm rotatable into abutment with a carriage transversely moveable relative to the discrete tracks, said carriage being associated with the movable section of track.

To enable the nature of the invention to be more readily understood one embodiment of the invention will now be described by way of example with reference to the accompanying drawings.

In the drawings:
FIG. 1 is a front diagrammatic elevation of a conveyor system incorporating the invention.
FIG. 2 is a plan view on the line II—II of FIG. 1.

Referring to the drawings the conveyor system comprises a series of substantially parallel discrete tracks 1 and 2 and package carries 3 suspended from the tracks. The carriers are each supported on a four-wheeled bogie 4 and are pushed along the track by push arms 5 which project from a driving chain 6 and abut against a shank portion 7 of the carrier. The chain is driven by a shaft 8 through a chain wheel 9.

A carrier transfer mechanism at the ends of the tracks comprises a short section of rail track 10 mounted on a carriage 11. The carriage 11 is moveable on a straight beam 12 arranged transversely relative to the discrete tracks 1 and 2. A rotatable arm 13 driven counterclockwise through a vertical shaft 14 is arranged to abut a stem portion 15 of the carrier 11 during part of a revolution of the arm.

A further rotatable arm 16 driven counterclockwise through a vertical shaft 17 is arranged to abut the shank 7 of each carrier as the carrier approaches the end of the rail track and to remain in abutment through most of the revolution of the arm. The shafts 14 and 17 are rotated at the same speed by an endless drive chain 18 which passes around chain wheels 19 and 20. Shaft 17 is driven from the main conveyor chain drive shaft 8 by a chain 21 through chain wheels 22 and 23. Shaft 17 is geared to rotate at twice the speed of shaft 8.

The operation of the conveyor mechanism is as follows.

A carrier travels along a length of the discrete track due to the push transmitted from the moving chain to the carrier by the push arms 5 and as the carrier reaches the end of the track, the rotating arm 16 moving into abutment with the carrier shank 7. The arm 16, rotating faster than the chain wheel 9, accelerates the carrier onto the short moveable section of track 10 while the path arm 5 rotates radially around the chain wheel 9 and out of engagement with the carrier shank 7. The carrier on track 10 comes against a stop (not shown) and continued rotation of arm 16 moves the carriage 11 along the transverse beam 12 until the track 10 is in alignment with the discrete track 1. During the transverse movement of carriage 11 relative sliding occurs between the shank 7 and the arm 16, the shank sliding radially inward along the arm.

When track 10 is aligned correctly, the continuous rotational movement of arm 16 moves the carrier of track 10 onto the discrete track 1, the push arm 5 rotating around the chain wheel re-engages the shank 7 and pushes the carrier along the track and the arm 16 moves out of engagement with the shank.

Since the carriage 11 and track 10 are aligned with track 1 and must be returned to align with track 2 in preparation for receipt of the next carrier, the revolving arm 13 abuts the carriage stem 15 and pushes the carriage 11 back along beam 12 until the track 10 is re-aligned with track 2. To ensure that the arm 13 moves out of abutment with stem 15 when the track is correctly realigned the rotational axis of the arm should be slightly offset from the mid position relative to the tracks, for example, the axis may be approximately 1 inch closer to track 1 than track 2.

It will be appreciated that the drive ratios between the shafts may be varied to suit the spacing of the carriers and that other positive drive methods for example gears may be used.

What is claimed is:
1. A conveyor system for passing material through an irradiation cell comprising
    (a) first and second fixed conveyor tracks arranged parallel to each other,
    (b) material carriers on said tracks,
    (c) means for moving uniformly spaced carriers along said tracks,
    (d) a further section of conveyor track arranged for transverse movement relative to the fixed tracks,
    (e) means for aligning said moveable track alternately with each of said fixed tracks,
    (f) a first rotatable arm, adapted to abut a carrier during part of the revolution of the arm, for transferring a carrier from a fixed track onto the longitudinally aligned moveable track and vice versa,
    (g) a second rotatable arm, adapted to abut said moveable track during part of the revolution of the arm, for moving the moveable track from alignment with one track to alignment with the other track, and
    (h) phasing means interconnecting said rotatable arms with the carrier moving means on the said fixed tracks whereby a carrier is transferred from one fixed track to the other fixed track in such manner that the spacing of the carriers on the fixed tracks remains uniform.

2. A conveyor system for passing material through an irradiation cell comprising
   (a) first and second fixed conveyor tracks arranged parallel to each other,
   (b) material carriers on said tracks,
   (c) means for moving uniformly spaced carriers along said tracks,
   (d) a further section of conveyor track supported on a carriage moveable on a track arranged transversely to the said fixed tracks,
   (e) means for aligning said further section of track with one of said fixed tracks,
   (f) a first rotatable arm, adapted to abut a carrier during part of the revolution of the arm, for transferring a carrier from a fixed track onto the longitudinally aligned moveable track and for transferring a carrier from the moveable track onto the other fixed track,
   (g) a second rotatable arm, adapted to abut said carriage during part of the revolution of the arm, for moving the track on said carriage from alignment with one track to alignment with the other track, and
   (h) phasing means interconnecting said rotatable arms with the carrier moving means associated with the said fixed tracks whereby a carrier is transferred from one fixed track to the other fixed track in such manner that the spacing of the carriers on the fixed tracks remains uniform.

3. A mono-rail conveyor system for passing material through an irradiation cell comprising
   (a) first and second fixed overhead conveyor tracks arranged parallel to each other,
   (b) material carriers suspended on said tracks,
   (c) driving chain means for moving uniformly spaced carriers along said tracks,
   (d) a further section of conveyor track supported on a carriage moveable on a track arranged transversely to the said fixed tracks,
   (e) means for aligning said moveable track with each of said fixed tracks,
   (f) a first arm rotatable in a horizontal plane and adapted to abut a carrier during part of the revolution of the arm, for transferring a carrier from a fixed track onto the longitudinally aligned moveable track and for transferring a carrier from the moveable track onto the other fixed track,
   (g) a second arm, rotatable in a horizontal plane and adapted to abut said carriage during part of the revolution of the arm, for moving the track on said carriage from alignment with one track to alignment with the other track, and
   (h) chain driven means interconnecting said rotatable arms with the carrier driving chain on the said fixed tracks whereby a carrier is transferred from one fixed track to the other fixed track in such manner that the spacing of the carriers on the fixed tracks remains uniform.

4. A mono-rail conveyor system for passing material through an irradiation cell comprising
   (a) first and second fixed overhead conveyor tracks arranged parallel to each other,
   (b) material carriers suspended on said tracks,
   (c) driving chain means for moving uniformly spaced carriers along said tracks,
   (d) a further section of conveyor track supported on a carriage moveable on a track arranged transversely to the said fixed tracks,
   (e) means for aligning said moveable track alternately with each of said fixed tracks,
   (f) a first arm, rotatable in a horizontal plane and adapted to abut a carrier during part of the revolution of the arm, for transferring a carrier from a fixed track onto the longitudinally aligned moveable track and vice versa,
   (g) a second rotatable arm, having its vertical rotational axis offset from the mid-position relative to the fixed tracks and adapted to abut said moveable track during part of the revolution of the arm, for moving the moveable track from alignment with one track to alignment wtih the other track, and
   (h) chain driven means interconnecting said rotatable arms with the carrier driving chain on the said fixed tracks whereby a carrier is transferred from one fixed track to the other fixed track in such manner that the spacing of the carriers on the fixed tracks remains uniform.

References Cited by the Examiner
UNITED STATES PATENTS

| | | | |
|---|---|---|---|
| 369,335 | 9/1887 | Goddu | 104—163 |
| 2,090,135 | 8/1937 | Linder | 104—49 |

ARTHUR L. LA POINT, *Primary Examiner.*

MILTON BUCHLER, *Examiner.*